US010697327B2

(12) United States Patent
Dubois et al.

(10) Patent No.: US 10,697,327 B2
(45) Date of Patent: Jun. 30, 2020

(54) SUPPORT INTERFACE AND DEVICE FOR AN ENGINE CASING

(71) Applicant: Safran Aircraft Engines, Paris (FR)

(72) Inventors: Margaux Justine Emma Dubois, Moissy-Cramayel (FR); Nelson Caetano, Moissy-Cramayel (FR); Alexandre Christophe Adrien Demoulin, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 144 days.

(21) Appl. No.: 15/760,930

(22) PCT Filed: Sep. 15, 2016

(86) PCT No.: PCT/FR2016/052341
§ 371 (c)(1),
(2) Date: Mar. 16, 2018

(87) PCT Pub. No.: WO2017/046536
PCT Pub. Date: Mar. 23, 2017

(65) Prior Publication Data
US 2018/0283215 A1 Oct. 4, 2018

(30) Foreign Application Priority Data

Sep. 17, 2015 (FR) ..................................... 15 58744

(51) Int. Cl.
F01D 25/28 (2006.01)
F01D 25/24 (2006.01)
(Continued)

(52) U.S. Cl.
CPC .............. F01D 25/285 (2013.01); B64F 5/50 (2017.01); B66C 1/107 (2013.01); F01D 25/24 (2013.01);
(Continued)

(58) Field of Classification Search
CPC ........ F01D 25/285; F01D 25/24; F01D 25/28; B66C 1/07; B64F 5/50; B64F 5/60; F05D 2240/14
See application file for complete search history.

(56) References Cited

U.S. PATENT DOCUMENTS 4,202,539 A    5/1980  Polastri et al.
6,513,781 B1 * 2/2003  Meyer ................... F01D 25/285
                                                       248/544

(Continued)

FOREIGN PATENT DOCUMENTS

FR        2990190          11/2013
WO    WO 2015/114276 A1    8/2015

OTHER PUBLICATIONS

International Search Report and Written Opinion with English translation dated Dec. 19, 2016, in corresponding International Application No. PCT/FR2016/052341 (12 pages).

Primary Examiner — Richard A Edgar
Assistant Examiner — Maxime M Adjagbe
(74) Attorney, Agent, or Firm — Bookoff McAndrews, PLLC

(57) ABSTRACT

The invention relates to the field of support interfaces, and in particular to such a support interface (30a, 30b) for an engine casing (90) and comprising a coupling part (50), a first plurality of bolts (80), and a plurality of pegs (70). The coupling part (50) has an outer face (52) presenting a cavity (42) suitable for receiving a support arm (20a, 20b), and an inner face (51) suitable for being mounted on an outer face (93) of the engine casing (90), together with a first plurality of orifices (53) between the outer face (52) and the inner face (51) of the coupling part (50). Each bolt (80) has a threaded shank (82) received in an orifice (53) of the first plurality of orifices (53), and a head (81) suitable for bearing against the outer face (52) of the coupling part (50). Each peg (70) has (Continued)

a threaded orifice (71) in which the threaded shank (82) of one of the bolts (80) of the first plurality of bolts (80) is engaged through a first end of the peg (70), each peg having a second end that is enlarged and suitable for bearing against an inner face (92) of the engine casing (90).

12 Claims, 3 Drawing Sheets

(51) Int. Cl.
  *B64F 5/50* (2017.01)
  *B66C 1/10* (2006.01)
(52) U.S. Cl.
  CPC ...... *F05D 2220/32* (2013.01); *F05D 2230/60* (2013.01); *F05D 2240/14* (2013.01); *F05D 2240/90* (2013.01); *F05D 2260/31* (2013.01)

(56) References Cited

U.S. PATENT DOCUMENTS

2012/0242100 A1   9/2012   Upshaw
2017/0166331 A1*  6/2017   Kohn ........................ B64F 5/50

\* cited by examiner

SUPPORT INTERFACE AND DEVICE FOR AN ENGINE CASING

CROSS-REFERENCE TO RELATED APPLICATIONS

This application is the U.S. national phase entry under 35 U.S.C. § 371 of International Application No. PCT/FR2016/052341, filed on Sep. 15, 2016, which claims priority to French Patent Application No. 1558744, filed on Sep. 17, 2015, the entireties of each of which are herein incorporated by reference.

BACKGROUND OF THE INVENTION

The present invention relates to a support interface. More particularly, the invention relates to a support interface for an engine casing, in particular for an aeroengine such as a turbojet or turbofan, and that is suitable for being used while the engine is being manufactured or maintained.

The invention also relates to a support device including such an interface, to an assembly comprising an engine casing and such a support device, and also to a method of mounting such an interface on an engine casing.

During engine assembly or handling, it is often necessary to hold the engine in a high position so as to give easier access to its various components. For that purpose, it is known to form at least two diametrically opposite cavities in the outer casing of an engine, and in particular of a turbine aeroengine, each of which cavities is to receive the end of a support arm secured to a frame. In order to hold the engine, a support arm is thus inserted into each cavity and is fastened to the casing, thereby holding the engine in a desired position.

With such a configuration, in order to ensure that each arm is well held, it is necessary for each cavity to present a working depth that is sufficient.

In order to obtain such a depth, the casing is generally provided with local extra thicknesses, also referred to as "bulges", with the cavities for receiving the arms being machined therein.

Those extra thicknesses lead to a considerable increase in the weight of the engine. However, for manifest reasons of efficiency, it is desirable for the weight of the engine to be minimized, and in particular for it not to be impacted by parts that are not of any use while it is in operation.

In order to solve that problem, support interfaces have been proposed that comprise a coupling part with an outer face and an inner face, the outer face of the coupling part presenting a cavity suitable for receiving a support arm, and the inner face of the coupling part being suitable for being mounted on an outer face of the engine casing.

Nevertheless, although those prior art support interfaces make it possible, at least to some extent, to avoid the extra weight that would result from forming bulges directly on the engine casing, such support interfaces are relatively complicated to fasten compared to the engine casing and such fastening can require fastener means to be incorporated in the casing, thereby likewise making it heavier.

OBJECT AND SUMMARY OF THE INVENTION

The present disclosure relates to a support interface for an engine casing that makes it possible to further reduce the additional weight that the casing requires in order to be fastened, while also enabling fastening to be simpler and with accurate positioning on the engine casing. For this purpose, in at least one embodiment, the support interface comprises: a coupling part, a first plurality of bolts, and a plurality of pegs. The coupling part has an outer face presenting a cavity suitable for receiving a support arm, and an inner face suitable for being mounted on an outer face of the engine casing, together with a first plurality of orifices between its outer and inner faces. Each bolt of the first plurality of bolts has a threaded shank received in an orifice of the first plurality of orifices and a head suitable for bearing against the outer face of the coupling part, and each peg of the plurality of pegs has a threaded orifice in which the threaded shank of one of said bolts is engaged through a first end of the peg, each peg also having a second end that is enlarged and suitable for bearing against an inner face of the engine casing.

The pegs facilitate both positioning and fastening the coupling part to the engine casing by means of the bolts, without it being necessary for threaded orifices to be tapped directly in the engine casing or for use to be made of nuts, which could be difficult to access on the inner face of the engine casing.

In order to ensure reliable transmission of forces in at least one plane extending transversely to one of the bolts, at least one orifice of said first plurality of orifices may present an inside surface complementary to an outside surface of the first end of the corresponding peg. More specifically, at least two orifices of said first plurality of orifices may each present an axisymmetric inside surface that is complementary to an outside surface of the first end of the corresponding peg, so that together they form two sliding pivot type connections that co-operate to hold the support interface stationary in all directions relative to the casing.

Furthermore, in order to provide support that is more reliable, the coupling part may present a second plurality of orifices, each orifice of the second plurality of orifices being threaded and opening out in the outer face of the coupling part. The orifices of this second plurality can thus provide additional mechanical connection, in particular in traction, to a support arm having its end received in the cavity against the outer face of the coupling part, in particular in order to avoid any accidental exit of this end of the support arm from the cavity in which it is received.

The present disclosure also provides a support device comprising both a first support interface of the above-mentioned type and a first support arm connected to a frame and having one end received in the cavity of the coupling part of the first support interface. The interface and the support arm can thus provide a stable connection between the frame and the engine casing. In particular, the coupling part may present a second plurality of orifices, each orifice of the second plurality of orifices being threaded and opening out in the outer face of the support part, the device then further comprising a second plurality of bolts connecting the support arm to the coupling part through the threaded orifices of the second plurality of orifices, in particular for the purpose of avoiding any accidental exit of the support arm from the cavity in which it is received.

Furthermore, the support device may also include a second support interface of the same type together with a second arm connected to a frame and having one end received in the cavity of the coupling part of the second support interface.

The present disclosure also provides an assembly comprising at least one engine casing and a support interface of the above-mentioned type, wherein the pegs are received in orifices going from an inner face to an outer face of the engine casing, the pegs having enlarged second ends bearing against the inner face of the engine casing. In order to facilitate mounting this assembly the pegs may be received by being pressed into said orifices in the engine casing. Thus, mounting the pegs by pressing them in avoids them turning while the threaded shanks of the bolts in the first plurality are being engaged in the threaded orifices of the pegs, thereby facilitating that operation.

Finally, the present disclosure also provides a method of mounting a support interface of the above-mentioned type on an engine casing, the method comprising the following steps:

inserting each of the pegs as far as its enlarged second end from an inner face of the engine casing into the orifices going from an inner face to an outer face of the engine casing;

placing the coupling part with its inner face on the outer face of the engine casing and the orifices of the first plurality of orifices in alignment with the pegs; and engaging the threaded shanks of the first plurality of bolts through the first plurality of orifices into the threaded orifices of the pegs in order to hold the coupling part stationary relative to the engine casing.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
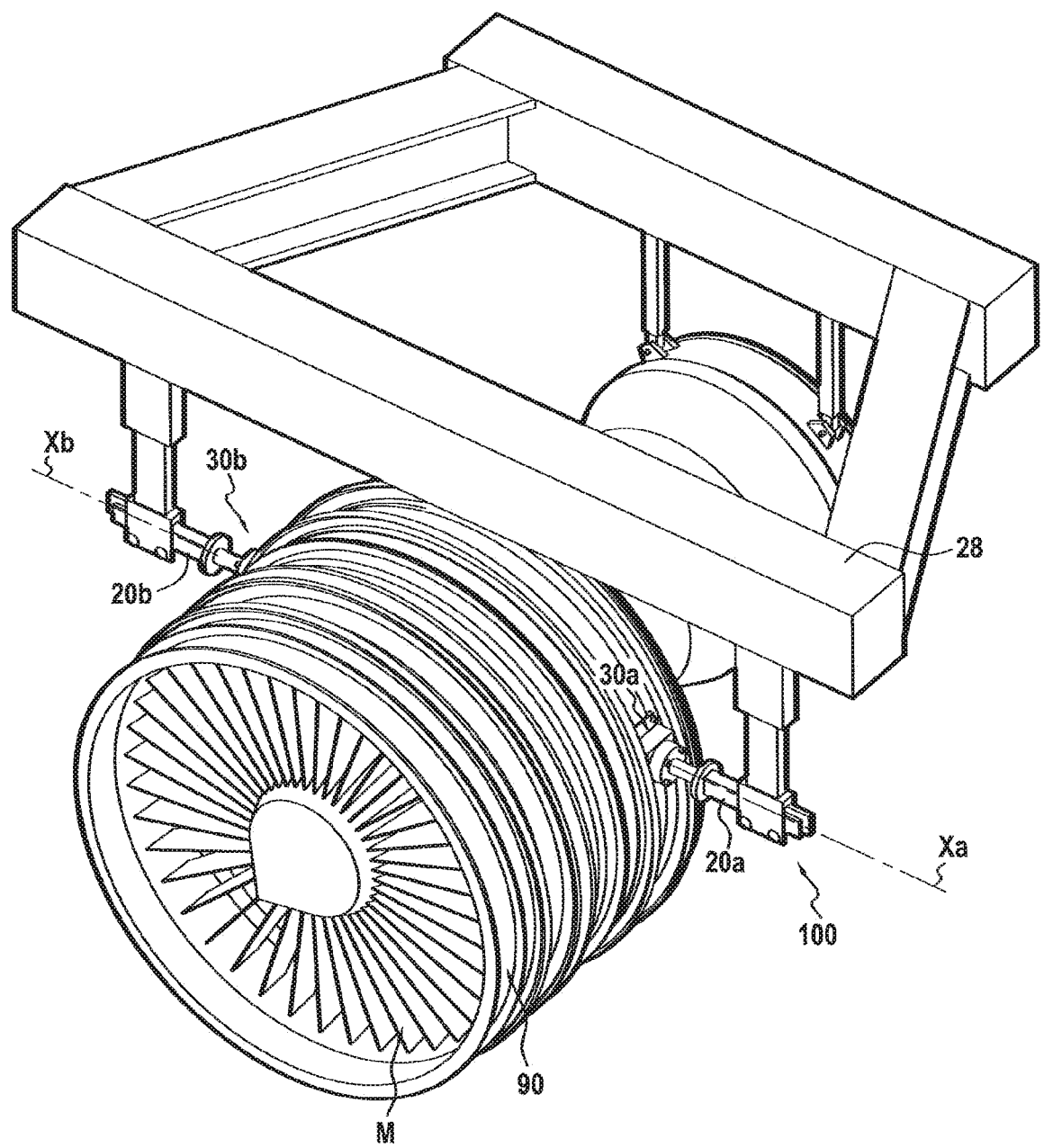
FIG. 1 is an overall view of an engine supported by a support device in an embodiment of the invention.

FIG. 1 shows a support device 100 constituting an embodiment of the invention co-operating with an annular fan casing 90 of turbofan M. Nevertheless, such as support device 100 may be applied in analogous manner to any other type of engine having a casing.

In this example, the support device 100 comprises a frame 28, two support arms 20a and 20b connected to the frame and extending along respective horizontal longitudinal axes Xa and Xb, and two support interfaces 30a, 30b each provided with a reception cavity 42 for receiving one of the support arms 20a, 20b.

Each support interface 30a, 30b is thus for connecting the casing 90 to a support arm 20a, 20b. When in position mounted on the support device 100, and as described in greater detail below, the casing 90 is thus supported by the arms 20a, 20b, via the two support interfaces 30a, 30b.

Movement means (not shown) enable each arm 20a, 20b to be moved, in particular along its longitudinal axis Xa, Xb.

As shown in FIG. 1, the support arms 20a, 20b are positioned substantially facing each other so as to leave between them sufficient space for receiving the engine casing 90. In the example, the two support arms 20a and 20b lie, more particularly, on the same axis.

In the example, each arm 20a, 20b has a distal portion 22 of constant cylindrical section, in this example of circular profile, extending from its end.

At a distance from its distal end, each arm 20a, 20b also includes an outer collar 24 having fastener orifices 26 for a function that appears more clearly from the description below.

Figure 2A:
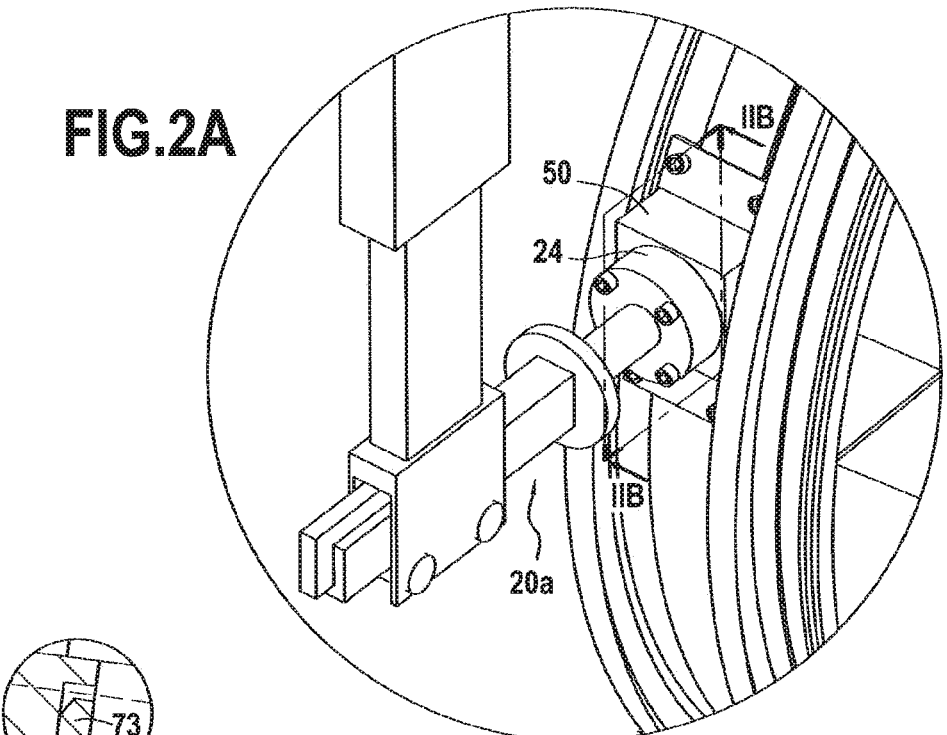
FIG. 2A shows a detail of the FIG. 1 support device fastened to the engine casing.
Figure 2B:
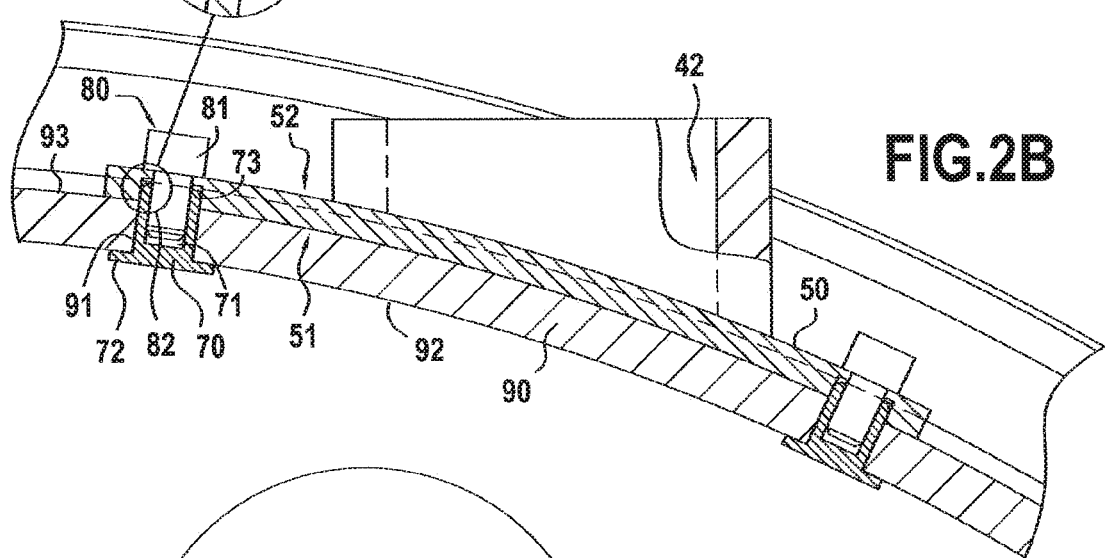
FIG. 2B is a cross-section of the engine casing, together with a portion of the FIG. 1 support device, on a plane IIB-IIB of FIG. 2A.

The first support interface 30a is shown in greater detail in FIGS. 2A and 2B. As shown in FIGS. 2A and 2B, each support interface 30a, 30b comprises a coupling part 50 and means for temporary assembly of the coupling part 50 on the casing 90. In the example shown, the coupling part 50 has an inner face 51, an outer face 52 in which the cavity 42 is formed, and a first plurality of orifices 53 passing from the inner face 51 to the outer face 52, and the temporary assembly means comprise a plurality of pegs 70 together with a first plurality of bolts 80. The second support interface 30b is analogous to the first in all respects, having its cavity 42 arranged symmetrically relative to the cavity of the first support interface 30a, although the geometrical configuration of the coupling part 50 and in particular of the orifices 53 therein could be different in order to match geometrical constraints that might differ on opposite sides of the casing 90.

Each peg 70 has a threaded orifice 71 that opens out at a first end 73 of the peg 70, and has an enlarged second end forming a collar 72. Each peg 70 is permanently installed in a through orifice 91 in the casing 90, with the collar 72 bearing against an inner face 92 of the casing 90, and with the first end 73 projecting from an outer face 93 of the casing 90. The pegs 70 are pressed into the orifices 91 so as to hold these pegs 70 both axially and against rotation relative to the casing 90. Each bolt 80 has a head 81 and a threaded shank 82. The heads 81 bear against the outer face 52 of the coupling part 50, while the threaded shank 82 of each bolt 80 is complementary to the threaded orifice 71 in a corresponding peg 70 and is engaged in the threaded orifice 71 through a corresponding orifice 53 of said first plurality of orifices 53 in the coupling part 50. For this purpose, the orifices 53 are in alignment with the pegs 70 and with the orifices 91 in the casing 90 in which the pegs 70 are installed.

The pegs 70 and the bolts 80 thus co-operate to hold the coupling part 50 axially with is inner face 51 pressed against an outer face 93 of the engine 90. In the embodiment shown, each peg 70 has its projecting first end 73 in contact with an inner surface of the corresponding orifice 53 and thus takes up forces that are transverse relative to the axes of the bolts 80. For this purpose, the inner surface of the orifice 53 and the outer surface at the first end 73 of the corresponding peg 70 are complementary. In particular, both of them may be axisymmetric, in particular they may be cylindrical or conical, so as to form a sliding pivot type connection. Such connections can thus suffice to hold an orifice part 50 stationary in all directions relative to the casing 90.

Furthermore, the coupling part 50 also has a second plurality of orifices 54 arranged around the cavity 42. These orifices 54 are threaded and in alignment with the fastener orifices 26 in the outer collars 24 of the arms 20a, 20b, so as to be capable of receiving through the fastener orifices 26 the threaded shanks of the bolts 85 connecting the outer collar 24 of the arms 20a, 20b to the coupling part 50 and taking up traction forces so as to avoid the ends of the arms 20a, 20b accidentally leaving the cavities 42. There is no need for the bolts 85 to be screwed tight, and it may even be preferable to leave a certain amount of clearance between the heads of the bolts 85 and the outer collar 24 of the corresponding arms 20a, 20b.

Figure 3A:
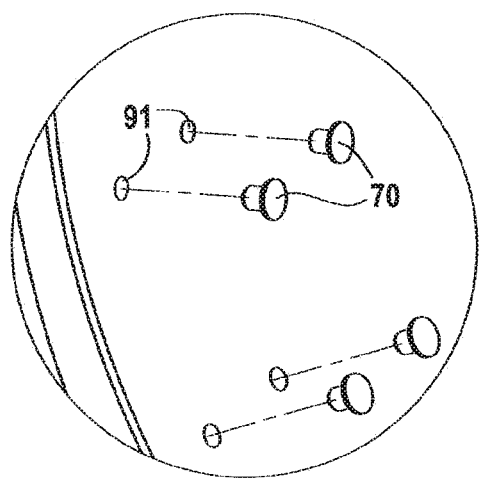
FIG. 3A shows a first step in a method of mounting the FIG. 1 support device, in which pegs are inserted into through orifices in the engine casing from an inside face of the engine casing.

A method of mounting the support device 100 is described with reference to FIGS. 3A to 3C. In a first step of the method, the pegs 70 are pressed into the orifices 91 in the casing 90 from the inner face 92 of the casing 90. It should be specified that this step may be performed prior to assembling the casing 90 around the turbofan M, thereby facilitating access to the inner face 92 for the operation of inserting the pegs 70.

Figure 3B:
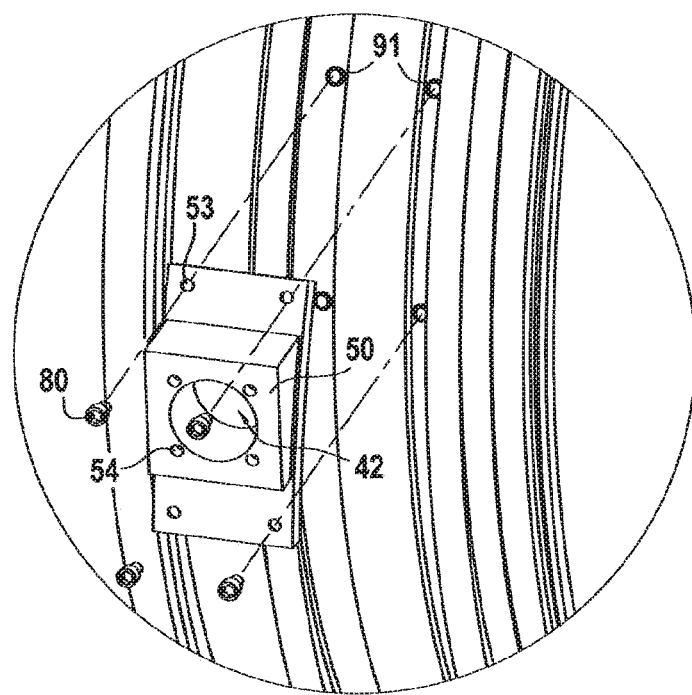
FIG. 3B shows subsequent steps of the method of mounting the FIG. 1 support device, in which a coupling part is placed on an outer face of the engine casing and is held thereto by a first plurality of bolts engaging with the pegs.

In a second step, shown in FIG. 3B, the coupling part 50 is placed on the outer face 93 of the casing 90, with the surfaces 51a, 51b of the inner face 51 of the coupling part 50 co-operating with the complementary surfaces 93a, 93b of the outer face 93 of the casing 90, and the orifices 53 of the first plurality of orifices of the coupling part 50 being in alignment with the pegs 70 and the orifices receiving them.

Thereafter, in a third step, also shown in FIG. 3B, the threaded rods 82 of the bolts 80 are engaged in the threaded orifices 71 of the pegs 70 through the orifices 53 of the coupling part 50 and they are tightened to hold the coupling part 50 stationary relative to the casing 90.

Figure 3C:
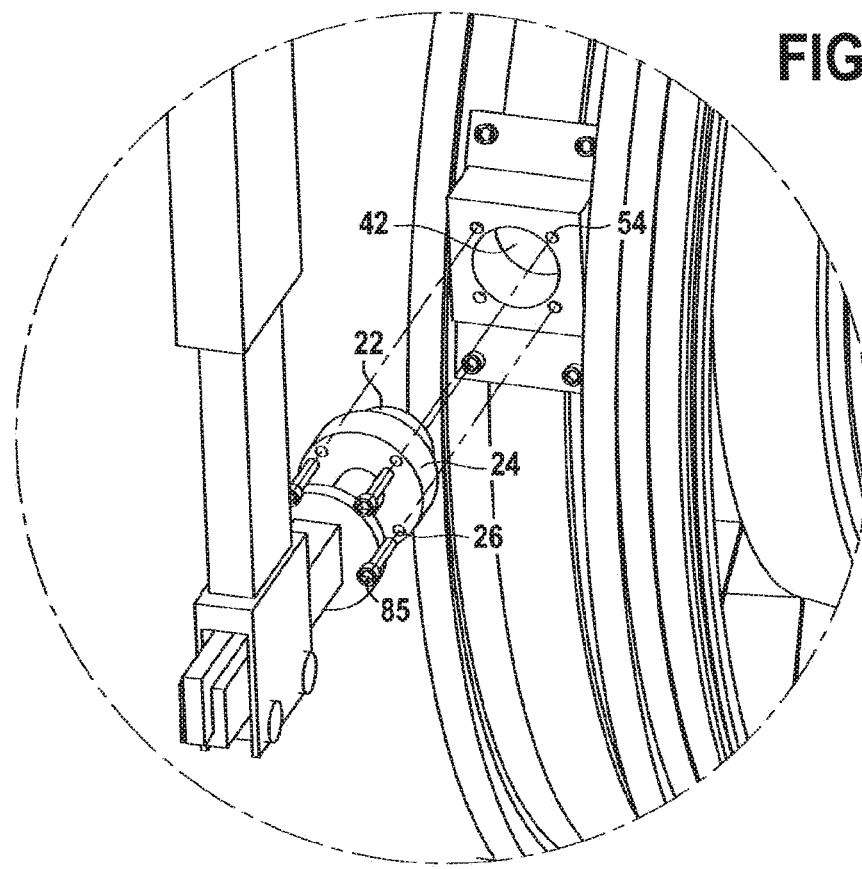
FIG. 3C shows final steps of the method of mounting the FIG. 1 support device, in which a support arm is received in a cavity in an outer face of the coupling part, and is also connected to the coupling part by a second plurality of bolts.

Once the coupling parts 50 are thus held stationary relative to the casing 90 so as to form the support interfaces 30a, 30b, it is possible to proceed to a fourth step, shown in FIG. 3C, in which each arm 20a, 20b is moved so as to be inserted into the corresponding cavity 42. Finally, in a fifth step that is also shown in FIG. 3C, the threaded shanks of the bolts 85 are engaged in the threaded orifices 54 of each coupling part 50 through the fastener orifices 26 in the outer collar 24 of the corresponding arm 20a, 20b in order to retain each arm 20a, 20b relative to the corresponding coupling part 50 and thus avoid any accidental disengagement of the arms 20a, 20b. The bypass turbojet M can thus be supported by the frame 28 via the arms 20a, 20b, the support interfaces 30a, 30b, and the casing 90.

Each of the second to fifth steps can be performed in reverse in the opposite order. Thus, if it is desired to separate the turbofan M from the frame 28, the bolts 85 are withdrawn initially, and then the arms 20a, 20b are extracted from the corresponding cavities 42. The bolts 80 and the coupling parts 50 can then be withdrawn so as to leave only the pegs 70, which are permanently installed in the casing 90 in the orifices 91.

Although the present invention is described with reference to a specific embodiment, it is clear that various modifications and changes may be undertaken on this embodiment without going beyond the general ambit of the invention as defined by the claims. Consequently, the description and the drawings should be considered in a sense that is illustrative rather than restrictive.

The invention claimed is:

1. A support interface for an engine casing, the support interface comprising:
   a coupling part having an outer face with a cavity suitable for receiving a support arm, and an inner face suitable for being mounted on an outer face of the engine casing, together with a first plurality of orifices between the outer face and the inner face of the coupling part;
   a first plurality of bolts, each having a threaded shank received in an orifice of the first plurality of orifices and a head suitable for bearing against the outer face of the coupling part; and
   a plurality of pegs, each peg of the plurality of pegs having a threaded orifice in which the threaded shank of one of the bolts of the first plurality of bolts is engaged through a first end of a respective peg, each peg also having a second end that is enlarged and suitable for bearing against an inner face of the engine casing.

2. The support interface according to claim 1, wherein at least one orifice of said first plurality of orifices presents an inside surface complementary to an outside surface of the first end of a corresponding peg of the plurality of pegs.

3. The support interface according to claim 2, wherein at least two orifices of said first plurality of orifices each present an axisymmetric inside surface that is complementary to the outside surface of the first end of the corresponding peg.

4. The support interface according to claim 1, wherein the coupling part presents a second plurality of orifices, each orifice of the second plurality of orifices being threaded and opening out in the outer face of the coupling part.

5. A support device having at least a first support interface according to claim 1, and a first support arm connected to a frame and having one end received in the cavity of the coupling part of the first support interface.

6. The support device according to claim 5, wherein the coupling part presents a second plurality of orifices, each orifice of the second plurality of orifices being threaded and opening out in the outer face of the coupling part, the support device further comprising a second plurality of bolts connecting the first support arm to the coupling part through the orifices of the second plurality of orifices.

7. The support device according to claim 5, including a second support interface, together with a second arm connected to the frame and having one end received in the cavity of the coupling part of the second support interface.

8. An assembly comprising at least one engine casing and the support interface of claim 1, wherein the pegs are received in orifices going from an inner face to an outer face of the engine casing, the pegs having enlarged second ends bearing against the inner face of the engine casing.

9. The assembly according to claim 8, wherein the pegs are received by being pressed into said orifices in the engine casing.

10. A method of mounting the support interface according to claim 1 on the engine casing, the method comprising the following steps:
    inserting each of the pegs as far as its enlarged second end from an inner face of the engine casing into the orifices going from the inner face to the outer face of the engine casing;
    placing the coupling part with its inner face on the outer face of the engine casing and the orifices of the first plurality of orifices in alignment with the pegs; and
    engaging the threaded shanks of the first plurality of bolts through the first plurality of orifices into the threaded orifices of the pegs in order to hold the coupling part stationary relative to the engine casing.

11. The support interface according to claim 1, wherein the cavity extends from the outer face of the coupling part towards the inner face of the coupling part.

12. The support interface according to claim 1, wherein the first end of each peg of the plurality of pegs contacts the coupling part.

* * * * *